United States Patent [19]
LaFreda

[11] 4,071,308
[45] Jan. 31, 1978

[54] DISPENSER FOR ICE CREAM OR THE LIKE
[76] Inventor: John T. LaFreda, 29196 Piping Rock Road, Sun City, Calif. 92381
[21] Appl. No.: 677,706
[22] Filed: Apr. 16, 1976
[51] Int. Cl.² .............................................. A47J 43/28
[52] U.S. Cl. ................................... 425/284; 425/286
[58] Field of Search ............... 425/280, 281, 282, 283, 425/284, 286, 285

[56] References Cited
U.S. PATENT DOCUMENTS

| 432,905 | 7/1890 | Schoch | 425/284 |
|---|---|---|---|
| 869,879 | 11/1907 | Cameran | 425/286 |
| 925,275 | 6/1909 | Benjamin | 425/286 |
| 1,360,324 | 11/1920 | Schubert | 425/284 |
| 1,799,827 | 4/1931 | Lawrence | 425/284 |
| 1,826,009 | 10/1931 | Martineau | 425/281 |
| 1,868,656 | 7/1932 | Brezin | 425/286 |
| 1,896,083 | 2/1933 | Harris | 425/286 |
| 2,615,405 | 10/1952 | Goodnight | 425/286 |
| 2,970,555 | 2/1961 | Baker et al. | 425/286 X |

Primary Examiner—Robert L. Spicer, Jr.
Assistant Examiner—William R. Briggs
Attorney, Agent, or Firm—John H. Crowe

[57] ABSTRACT

A measuring dispenser for ice cream embodying a handle carrying an open ended cylinder to be pressed into a mass of ice cream to fill the cylinder. To eject the accumulated scoop of ice cream, the handle and an adjacent lever are squeezed, causing a piston in the cylinder to both rotate and to move axially against the scoop of ice cream. Rotation of the piston, along with a scraper element movable therewith, facilitates breaking of the body of frozen ice cream from the wall of the cylinder and the scraper element scrapes off any ice cream adhering to the wall.

1 Claim, 7 Drawing Figures

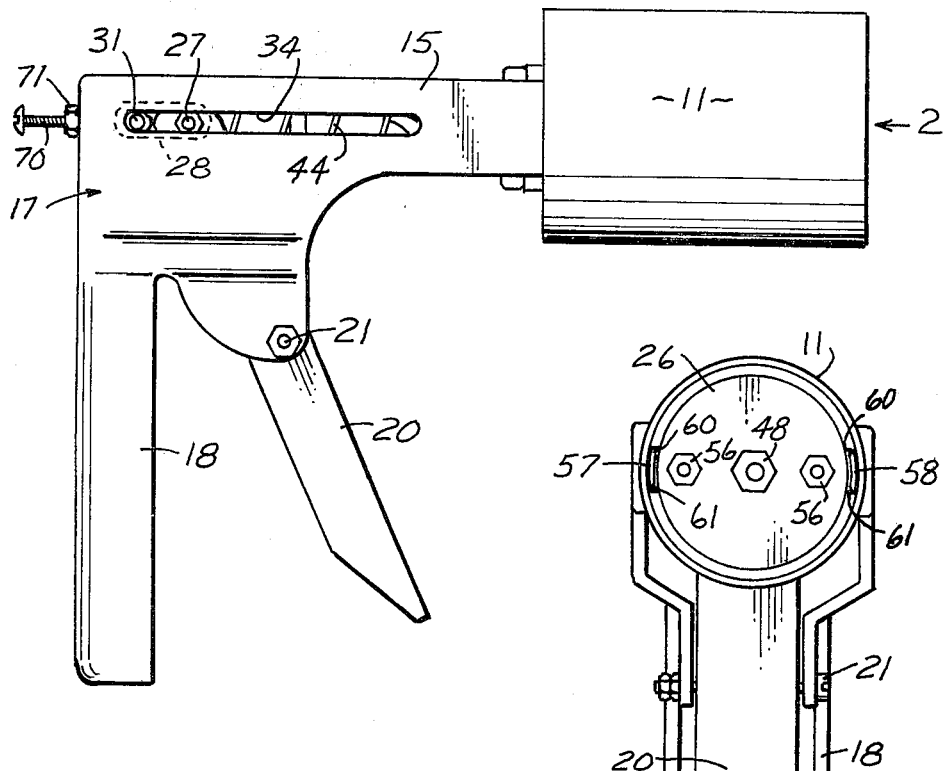
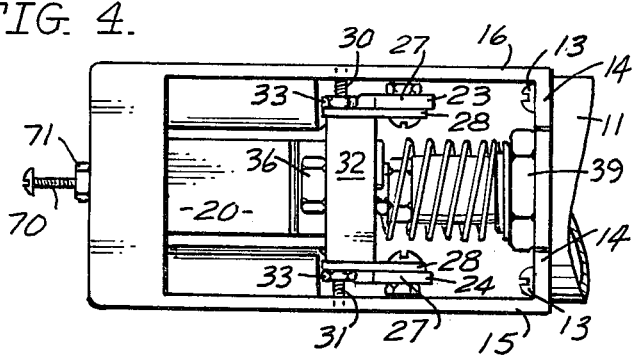
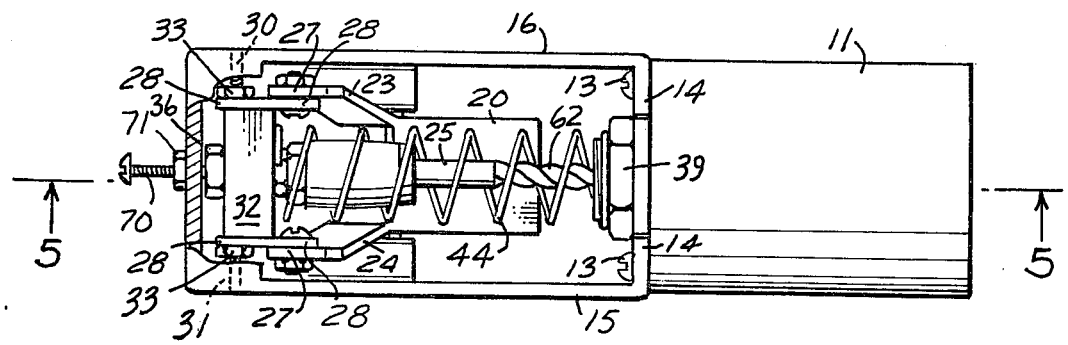

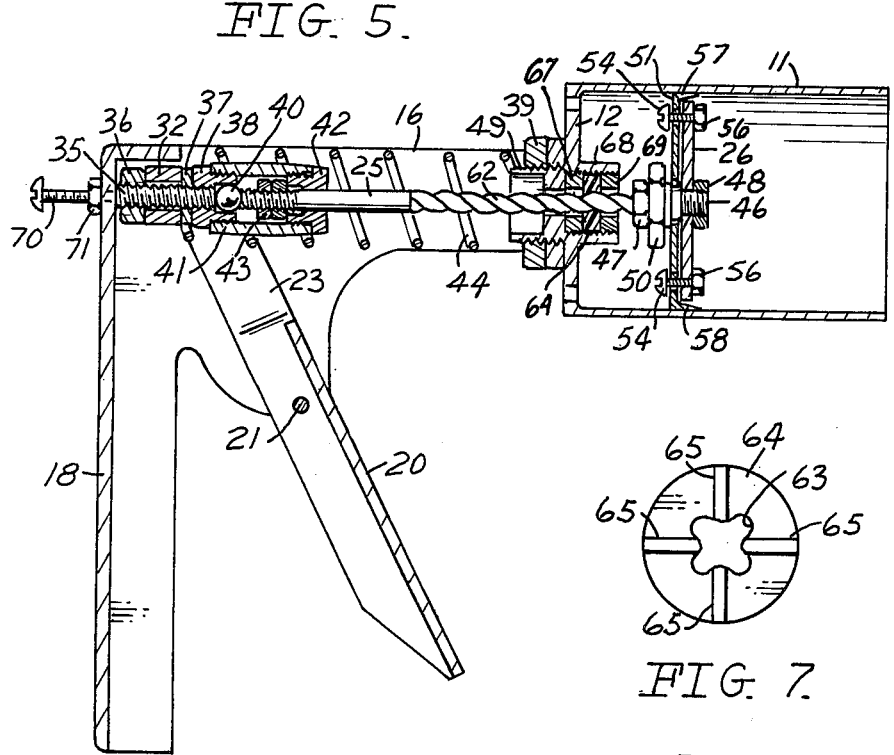
FIG. 5.
FIG. 7.
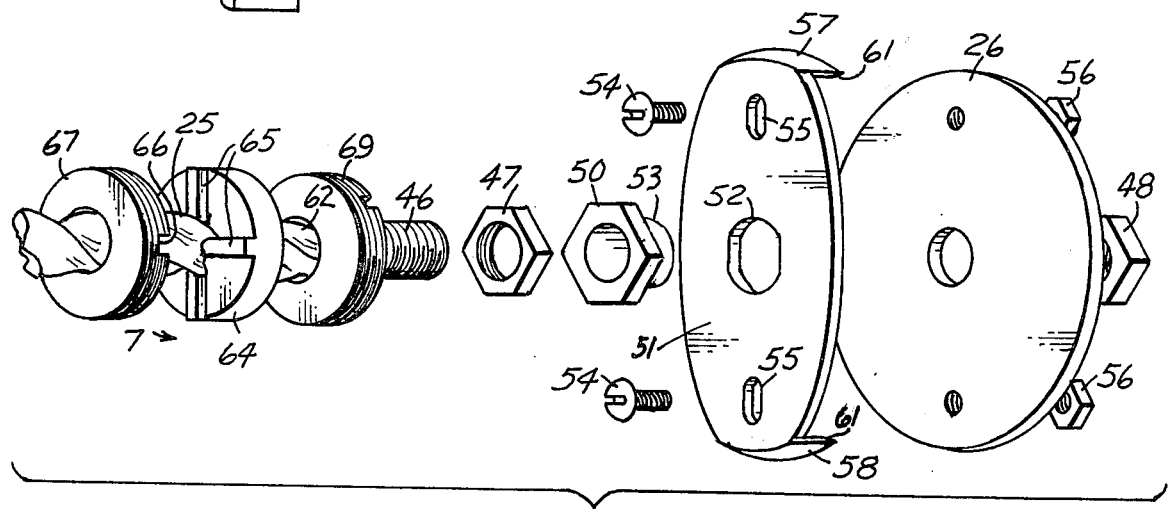
FIG. 6.

DISPENSER FOR ICE CREAM OR THE LIKE

BACKGROUND OF THE INVENTION

1. Field of the Invention

This invention relates to dispensers for ice cream and similar frozen materials.

2. Description of the Prior Art

Ice cream dispensers have been employed heretofore using a hand held cylinder which is pressed into a container of ice cream to accumulate a measured scoop in the cylinder. A piston is thereafter moved along the cylinder to eject the scoop of ice cream.

Although such prior dispensers are effective to dispense relatively accurately measured amounts of ice cream, such ice cream, particularly when frozen hard, tends to adhere to the walls of the cylinder, thereby making it difficult to eject the scoop. Even though the main body of the scoop may be ejected, a coating of frozen ice cream tends to adhere to the cylinder wall, causing difficulty in subsequently moving the piston.

SUMMARY OF THE INVENTION

A principal object of the present invention is to obviate the above noted difficulties with ice cream dispensers of this type.

Another object is to provide an ice cream dispenser which is simple, compact and inexpensive to manufacture.

According to my present invention, an open ended cylinder is provided which is carried at its opposite end by a handle. An ejecting piston carrying a wall scraping element is movable lengthwise along the cylinder by a lever which is squeezed along with the handle. Means are provided to rotate the piston along with the scraping element during movement thereof along the cylinder to facilitate breaking the scoop of ice cream from the cylinder wall and to scrape any adhering frozen particles from such wall. Such scraping element also permits the cylinder to be slightly out-of-round or slightly out of axial alignment with the piston, due to manufacturing inaccuracies or the like, without interfering with rotation or axial movement of the piston.

BRIEF DESCRIPTION OF THE DRAWINGS

The manner in which the above and other objects of the invention are accomplished will be readily understood on reference to the following specification when read in conjunction with the accompanying drawings, wherein:

FIG. 1 is a side elevation view of an ice cream dispenser embodying a preferred form of the present invention.

FIG. 2 is a front view of the dispenser and is taken in the direction of the arrow 2 of FIG. 1.

FIG. 3 is a plan view, partly in section, of the dispenser.

FIG. 4 is a plan view similar to FIG. 3 but partly broken away and illustrating the parts at the end of an ejecting stroke.

FIG. 5 is a sectional elevation view of the dispenser and is taken along line 5—5 of FIG. 3.

FIG. 6 is an exploded view illustrating particularly the piston, scraper blade and piston shaft assembly.

FIG. 7 is a rear view of a stationary nut and is taken in the direction of the arrow 7 in FIG. 6.

DESCRIPTION OF THE PREFERRED EMBODIMENT

Referring to the drawings, the dispenser comprises a cylinder 11, preferably of plastic, which is open at its right hand end and is closed at its left hand end by an integral wall 12. The cylinder 11 is secured by screws 13, FIGS. 3 and 4, to inturned ears 14 formed on laterally spaced side members 15 and 16 of a generally L-shaped handle member 17, the latter forming a handle 18. An actuating lever 20 is pivotally supported at 21 between the side members 15 and 16 and is bifurcated above the pivot 21 to form spaced arms 23 and 24 which straddle a piston shaft 25 attached to an ejecting piston 26 as will appear later. Arms 23 and 24 are pivoted at 27 to rearwardly extending links 28 (see also FIG. 1) which, in turn, are pivotally connected to trunnion rods 30 and 31 screw threaded into opposite ends of a crosspiece 32. The rods 30 and 31 are locked in place by nuts 33 and extend into aligned elongated guide slots 34 in the side members 15 and 16 to guide the crosspiece 32 fore and aft, axially of the cylinder 11. Crosspiece 32 has an opening therein fitted over a screw threaded rod 35, extending coaxially of the piston shaft, and is located on the rod by nuts 36 and 37. A bushing 38 is also fitted on the rod 35 and receives an anti-friction ball thrust bearing 40 which engages the left hand end of the piston shaft 25.

A sleeve 41 is threaded onto the bushing 38 and is also threadably connected to a second bushing 42 having a bearing therein which rotatably supports the left hand end of the piston shaft 25. Lock nuts 43 are threaded on the left hand end of the piston shaft 25 to retain the same within bushing 42 and in bearing engagement with the ball 40.

A spring 44 extends over the piston shaft 25 and sleeve 41 and is compressed between a nut 39 threaded over a hub 49 on the wall 12 of the cylinder 11 and the crosspiece 32 to normally return the lever 20 and parts connected thereto to their normal positions shown in FIGS. 1 and 5.

For the purpose of attaching the piston 26 to the right hand end of the shaft 25, the latter is screw threaded to receive clamp nuts 47 and 48 on opposite sides of the piston 26. A bushing 50 is loosely fitted over the right hand end of the piston shaft 35 and is clamped, along with the piston 26, between the nuts 47 and 48.

It will be noted that there is appreciable clearance between the outer periphery of the piston 26 and the inner surface of the cylinder 11. A generally U-shaped scraper element 51 is mounted against the left hand side of the piston 26 and is permitted a limited amount of movement radially of shaft 25. For this purpose, the scraper element 51 has an elongated hole 52 therein which slideably embraces a guide shoulder 53 on bushing 50. Also, retainer screws 54 extend through elongated slots 55 in the scraper element and are threaded into the piston 26, lock nuts 56 being provided to lock the screws in place. However, such screws are not tightened against scraper element 51, permitting the aforementioned radial movement of the scraper element.

Diametrically located scraper blades 57 and 58 are formed on the scraper element 51. Such blades extend between the outer periphery of the piston 26 and the inner wall surface of the cylinder 11. The outer dimension of the scraper element 51, as measured across the outer edges of the scraper blades 57 and 58, is slightly smaller than the inside diameter of the cylinder 11 to permit the aforementioned limited radial movement of the scraper element 51.

It will be noted that the blades 57 and 58 extend forwardly of the piston 26 and the opposite edges 60 and 61 (see also FIGS. 2 and 6) of each blade are sharpened to effectively scrape any ice cream adhering to the inner surface of the cylinder 11.

The piston shaft 25 has a helically fluted section 62 formed along a major portion of the length thereof which is slideably received in a mating opening 63, FIGS. 6 and 7, formed in a nut member 64. Member 64 has laterally extending tongues 65 thereon which fit in mating grooves 66 formed in a hollow nut 67 which is screw threaded within a hub 68 formed in the cylinder wall 12. A hollow retainer nut 69 is also threaded within the hub 48 to clamp the nut member 64 against nut 67 and thus prevent rotation of the nut member 64. In order to adjustably control the volume of the scoop of ice cream to be dispensed, a limit screw 70 is threaded through the back of the handle member 17 to engage and limit leftward movement of the rod 35, and thus of the piston 26. A lock nut 71 is threaded on the screw 70 to lock the same in any adjusted position.

Describing now the operation of the dispenser, the operator merely forces the cylinder 11 endwise into a container of frozen ice cream by pressing down on the back of the handle 18 until the cylinder is filled. He then twists the dispenser about the axis of the cylinder 11 to break or shear the scoop accumulated in the cylinder 11 from the remainder of the mass within the container. Such shearing will occur along a plane coincident with the right hand end of the cylinder 11. During this twisting movement, the scoop of ice cream within the cylinder tends to adhere to the cylinder wall and thus twists with the cylinder. This twisting movement of the scoop is aided somewhat by the piston 26 and forwardly extending portions of the scraper element blades 57 and 58 which, at this time, also tend to adhere to the scoop and twist with the cylinder 11.

In ejecting the scoop of ice cream, the operator squeezes the lever 20 toward the handle 18, forcing the piston shaft 25 to the right. Thus, the nut member 64 rotates the shaft 25 and piston 26 during their ejecting movement. Accordingly, the scraper blades 57 and 58 scrape the walls of the cylinder 11 and also, since they engage the rear end of the scoop of ice cream, they tend to aid the piston 26 in rotating the scoop as well as moving it lengthwise to break the scoop from the wall of the cylinder 11. As the scraper element 51 rotates it is allowed a slight radial movement to follow any out-of-alignment relation between the piston and cylinder or any out-of-round sections of the cylinder while effectively shaving any frozen ice cream which may coat or adhere to the wall of the cylinder.

It will be obvious to those skilled in the art that many variations can be made in the exact structure disclosed without departing from the spirit of this invention.

I claim:

1. A dispenser for ice cream or similar frozen material comprising:

a cylinder open at one end;
   means forming a handle for supporting said cylinder at the opposite end thereof;
   a piston movable along the axis of said cylinder;
   a lever pivotally supported by the handle forming means, said lever extending adjacent said handle;
   means connecting said lever to said piston whereby the squeezing of said handle and of said lever together causes said piston to move along said cylinder to eject a scoop of ice cream or similar frozen material therefrom; and
   means responsive to the movement of said piston to rotate said piston about said axis;
   said dispenser including a scraper connected to said piston so as to be rotatably movable therewith, said scraper being engageable with the inner surface of said cylinder whereby to scrape ice cream adhering to said inner surface therefrom;
   said scraper comprising diametrically oppositely disposed scraper blades that extend lengthwise of said cylinder and on the side of said piston adjacent the open end of the cylinder;
   said dispenser including means permitting free radial movement of said scraper relative to said piston.

* * * * *